UNITED STATES PATENT OFFICE.

SARAH M. BARNES, OF LAFAYETTE, VIRGINIA.

IMPROVEMENT IN MEDICAL COMPOUNDS OR ANTI-DYSPEPTIC BITTERS.

Specification forming part of Letters Patent No. 132,233, dated October 15, 1872; antedated October 12, 1872.

*To all whom it may concern:*

Be it known that I, SARAH M. BARNES, of Lafayette, in the county of Montgomery and State of Virginia, have invented or produced a new Medical Compound, which I denominate "Anti-Dyspeptic and Family Bitters;" and I do hereby declare that the following is a full, clear, and exact description of the ingredients composing and the manner of compounding the same.

To make, for instance, five gallons of the bitters I use the following-named ingredients in the proportionate quantities designated: Socotrinia aloes, pulverized, one and one-fourth pound; rhubarb, pulverized, one and one-fourth pound; anise-seed, ten ounces; cardamom-seed, ten ounces; ground gentian, ten ounces; jalap, pulverized, four ounces; white mustard-seed, four ounces; alcohol, two and one-half gallons; water, two and one-half gallons.

In compounding the bitters I place the alcohol in a keg or barrel, and add the aloes, rhubarb, anise-seed, cardamom-seed, ground gentian, jalap, and mustard-seed. Then the compound is allowed to stand for twenty-four hours, when the water is added, after which it is thoroughly shaken every day for the next ten days, and again allowed to stand five days to settle, when it is fit for use.

The compound hereby produced is a valuable tonic, as it agrees with the most delicate stomach, removing nausea, pain, and debility from that organ, and through it giving tone and vigor to the entire system. As an anti-dyspeptic it not only neutralizes and prevents the formation of acids, but checks fermentation, and prevents the accumulation of gases from food in the stomach, while the ingredients, having a purgative property, cause the bowels to be freely and naturally evacuated without pain, local or general debility.

Having described my invention, I claim—

The bitters, compounded from the ingredients in or in about the proportions named, as herein described.

SARAH M. BARNES.

Witnesses:
 J. A. RAYBURN,
 E. H. TAYLOR.